United States Patent
Murase

(10) Patent No.: US 10,436,637 B2
(45) Date of Patent: Oct. 8, 2019

(54) UNEVENNESS EVALUATION METHOD AND UNEVENNESS EVALUATION APPARATUS

(71) Applicant: IIX INC., Tokyo (JP)

(72) Inventor: Hiroshi Murase, Tokyo (JP)

(73) Assignee: IIX INC., Tokyo (JP)

( * ) Notice: Subject to any disclaimer, the term of this patent is extended or adjusted under 35 U.S.C. 154(b) by 66 days.

(21) Appl. No.: 16/096,264

(22) PCT Filed: Mar. 16, 2017

(86) PCT No.: PCT/JP2017/010556
§ 371 (c)(1),
(2) Date: Oct. 24, 2018

(87) PCT Pub. No.: WO2017/187827
PCT Pub. Date: Nov. 2, 2017

(65) Prior Publication Data
US 2019/0137334 A1    May 9, 2019

(30) Foreign Application Priority Data
Apr. 28, 2016 (JP) .................................. 2016-091642

(51) Int. Cl.
*G01J 1/44* (2006.01)
*G01J 1/42* (2006.01)

(52) U.S. Cl.
CPC .......... *G01J 1/44* (2013.01); *G01J 2001/4252* (2013.01)

(58) Field of Classification Search
CPC .......... G06T 2207/20024; G06T 5/002; H04N 9/646; H04N 19/117
See application file for complete search history.

(56) References Cited

U.S. PATENT DOCUMENTS

| 2010/0013750 A1 | 1/2010 | Kerofsky et al. |
| 2011/0012908 A1 | 1/2011 | Daly |

(Continued)

FOREIGN PATENT DOCUMENTS

| JP | H09153136 A | 6/1997 |
| JP | 2008241407 A | 10/2008 |
| JP | 2009180583 A | 8/2009 |

OTHER PUBLICATIONS

Asano, Toshio et al., "Image Quality Evaluation Based on Human Visual Perception" Annu Conf IEEE Ind Electron Soc, 2011, vol. 37th vol. 3, p. 2141-2146.

(Continued)

*Primary Examiner* — Edward Park
(74) *Attorney, Agent, or Firm* — Alleman Hall Creasman & Tuttle LLP

(57) ABSTRACT

Given that a plurality of visual transfer function curves for a display panel are provided for each of different ranges from the display panel, two-dimensional luminance distribution data of the display panel is filtered using a filter having visual frequency characteristics substantially passing through: a part where a recognition sensitivity increases as a spatial frequency increases in a short-range function curve, which among the plurality of visual transfer function curves is the closest to the display panel; a peak part of the short-range function curve; a peak part in a long-range function curve, which among the plurality of visual transfer function curves is the farthest from the display panel; and a part where the recognition sensitivity decreases as the spatial frequency increases in the long-range function curve. An evaluation value of luminance unevenness of the display panel is calculated on the basis of the filtered two-dimensional filtering data.

8 Claims, 6 Drawing Sheets

(56) References Cited

U.S. PATENT DOCUMENTS

| | | | |
|---|---|---|---|
| 2014/0035972 A1* | 2/2014 | Hasegawa | H04N 13/366 |
| | | | 345/694 |
| 2014/0198984 A1* | 7/2014 | Chen | G06T 7/001 |
| | | | 382/167 |
| 2016/0011121 A1 | 1/2016 | Tomioka | |

OTHER PUBLICATIONS

ISA Japan Patent Office, International Search Report Issued in Application No. PCT/JP2017/010556, dated Jun. 6, 2017, WIPO, 3 pages.
Barten, P, "Formula for the contrast sensitivity of the human eye" Proceedings of "SPIE," Dec. 18, 2003, San Jose, California, 10 pages.
Pappas, T et al., "Perceptual Criteria for Image Quality Evaluation," Handbook of Image and Video Processing (Second Edition) Jun. 7, 2005, 22 pages.
European Patent Office, Extended European Search Report Issued in Application No. 17789116.5, dated Jul. 22, 2019, Germany, 13 pages.

* cited by examiner

UNEVENNESS EVALUATION METHOD AND UNEVENNESS EVALUATION APPARATUS

TECHNICAL FIELD

The present invention relates to an unevenness evaluation method and an unevenness evaluation apparatus that make it possible to quantitatively evaluate unevenness in a display panel.

BACKGROUND ART

Unevenness arises in display panels, such as liquid crystal panels and organic electroluminescent (EL) panels, due to inconsistencies in manufacturing processes, and there has been a desire to quantitatively evaluate the extent of such unevenness to judge whether products are non-defective or defective, carry out grading, and so on.

Evaluation based on the amplitude of unevenness (contrast) can be considered as a way to easily make a quantitative evaluation. However, such a method is problematic in that display panels having unevenness that, while having a high amplitude, is not visually bothersome to humans (or cannot be seen at all) are judged to be defective, whereas display panels having unevenness that, while having a low amplitude, is visually bothersome to humans (or simply can be seen) are judged to be non-defective.

Patent Document 1 describes a method in which luminance distribution information of a display panel (display) is obtained, and a contrast image is generated by finding a luminance change amount from the difference between the luminance distribution information and a background luminance and then dividing the luminance change amount by the background luminance. The contrast image is then subjected to a two-dimensional Fourier transform to obtain a two-dimensional Fourier spectrum, after which a convolution power spectrum is found by multiplying the two-dimensional Fourier spectrum by a visual transfer function (a contrast sensitivity function) based on the vision characteristics of humans. Finally, the convolution power spectrum is subjected to a two-dimensional inverse Fourier transform, and luminance unevenness in the display panel is quantitatively evaluated. In consideration of background luminance dependence and screen size dependence, Barten's formula is used as the stated function.

CITATION LIST

Patent Document

Patent Document 1: JP 2009-180583A

SUMMARY OF INVENTION

Technical Problem

Incidentally, the size and visibility range of a display panel differs depending on the application and usage method thereof, and thus a quantitative evaluation of unevenness using a single visual transfer function is unlikely to produce an evaluation suited to a variety of applications and usage methods. Patent Document 1 accounts for the screen size dependence with a coefficient in Buten's formula, but this means that different visual transfer functions (visual frequency characteristics) are used depending on the size of the screen in the display panel, and does not mean that an appropriate quantitative evaluation can be made comprehensively for a variety of screen sizes using the evaluation method described in that document.

Having been achieved in light of the foregoing circumstances, the present invention provides an unevenness evaluation method and an unevenness evaluation apparatus that enable quantitative evaluations of unevenness suited to a variety of display panel applications and usage methods.

Solution to Problem

To solve the above-described problem, an unevenness evaluation method according to the present invention includes: an image capturing step of capturing an image of a display image in a display panel using image capturing means; a luminance distribution data calculation step of calculating two-dimensional luminance distribution data of the display panel on the basis of the image of the display image captured by the image capturing means; a filter processing step of filtering the two-dimensional luminance distribution data using a filter, where given that a plurality of visual transfer function curves for the display panel, in which as a spatial frequency increases, a recognition sensitivity increases, reaches a peak, and then decreases, are provided for each of different ranges from the display panel, the filter has visual frequency characteristics substantially passing through a part where the recognition sensitivity increases as the spatial frequency increases in a short-range function curve which among the plurality of visual transfer function curves is the closest to the display panel, a peak part of the short-range function curve, a peak part in a long-range function curve which among the plurality of visual transfer function curves is the farthest from the display panel, and a part where the recognition sensitivity decreases as the spatial frequency increases in the long-range function curve; and an evaluation value calculation step of calculating an evaluation value of luminance unevenness of the display panel on the basis of two-dimensional filtering data filtered by the filter.

An unevenness evaluation apparatus according to the present invention includes: image capturing means for capturing a display image in a display panel; luminance distribution data calculation means for calculating two-dimensional luminance distribution data of the display panel on the basis of the image of the display image captured by the image capturing means; filter processing means for filtering the two-dimensional luminance distribution data using a filter, where given that a plurality of visual transfer function curves for the display panel, in which as a spatial frequency increases, a recognition sensitivity increases, reaches a peak, and then decreases, are provided for each of different ranges from the display panel, the filter has visual frequency characteristics substantially passing through a part where the recognition sensitivity increases as the spatial frequency increases in a short-range function curve which among the plurality of visual transfer function curves is the closest to the display panel, a peak part of the short-range function curve, a peak part in a long-range function curve which among the plurality of visual transfer function curves is the farthest from the display panel, and a part where the recognition sensitivity decreases as the spatial frequency increases in the long-range function curve; and evaluation value calculation means for calculating an evaluation value of luminance unevenness of the display panel on the basis of two-dimensional filtering data filtered by the filter.

In both the unevenness evaluation method and the unevenness evaluation apparatus according to the present invention, the visual transfer function curves are preferably expressed as follows:

$$V = v_1 \times (v_2 + v_3) \times 1.46032$$

$$v_1 = 1 - \exp(-f^{0.75} \times 1.333)$$

$$v_2 = \exp(-f^{1.2} \times 0.163)$$

$$v_3 = \exp\{-(f - 7.59)^2 \times 0.0246\} \times 0.13$$

f: spatial frequency (cycle/degree)

Furthermore, preferably, the filter is configured by cascade-connecting a low-pass filter and a high-pass filter.

According to the unevenness evaluation method and the unevenness evaluation apparatus of the present invention, it is assumed that a plurality of visual transfer function curves for the display panel, in which as the spatial frequency increases, the recognition sensitivity increases, reaches a peak, and then decreases, are provided for each of different ranges from the display panel. In this case, a filter process is carried out using a filter having visual frequency characteristics substantially passing through: a part where the recognition sensitivity increases as the spatial frequency increases in a short-range function curve, which among the plurality of visual transfer function curves is the closest to the display panel; a peak part of the short-range function curve; a peak part in a long-range function curve, which among the plurality of visual transfer function curves is the farthest from the display panel; and a part where the recognition sensitivity decreases as the spatial frequency increases in the long-range function curve. Through this filter process, an unevenness evaluation value appropriate for the vision characteristics of a human when the display panel is viewed within a predetermined distance range can be calculated, making a quantitative evaluation of unevenness, suited to a variety of applications and usage methods of display panels, possible.

Furthermore, the visual transfer function curves are expressed as follows:

$$V = v_1 \times (v_2 + v_3) \times 1.46032$$

$$v_1 = 1 - \exp(-f^{0.75} \times 1.333)$$

$$v_2 = \exp(-f^{1.2} \times 0.163)$$

$$v_3 = \exp\{-(f - 7.59)^2 \times 0.0246\} \times 0.13$$

f: spatial frequency (cycle/degree)

In this case, the evaluation values at low contrast, which are important in unevenness evaluations of display panels, can be made highly reliable (note that a defective judgment can be made for high-contrast unevenness, without needing to find an evaluation value), and if the filter is configured by cascade-connecting a low-pass filter and a high-pass filter, the number of taps can be reduced, and the amount of calculation required by the evaluation can be reduced.

Advantageous Effects of Invention

According to the present invention, quantitative evaluations of unevenness suited to a variety of display panel applications and usage methods are possible.

DESCRIPTION OF EMBODIMENTS

An embodiment for carrying out the present invention will be described using the drawings.

Figure 1:
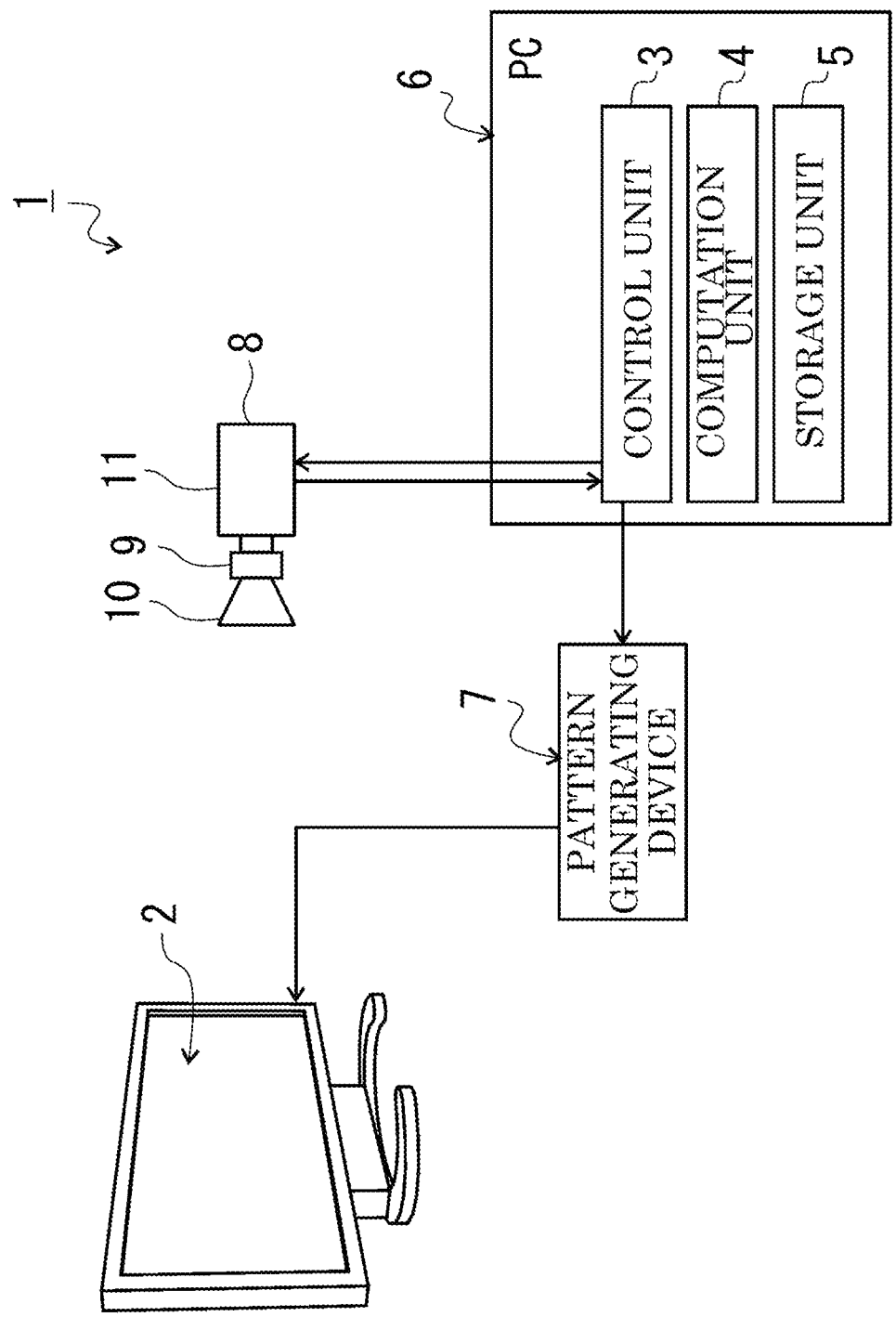
FIG. 1 is a schematic diagram illustrating an unevenness evaluation apparatus according to an embodiment for carrying out the invention.

FIG. 1 illustrates an unevenness evaluation apparatus 1 according to the present embodiment. This unevenness evaluation apparatus 1 quantitatively evaluates unevenness in a display panel 2, which is an organic electroluminescent (EL) panel. The unevenness evaluation apparatus 1 includes: a computer 6 having a control unit 3, a computation unit 4, and a storage unit 5; a pattern generating device 7 that causes a prescribed pattern to be displayed in the display panel 2; and a camera 11 constituted by a main camera unit 8, which has a solid-state image sensor such as a charge-coupled device (CCD), and a lens 10, which has a focus ring 9.

Figure 2:
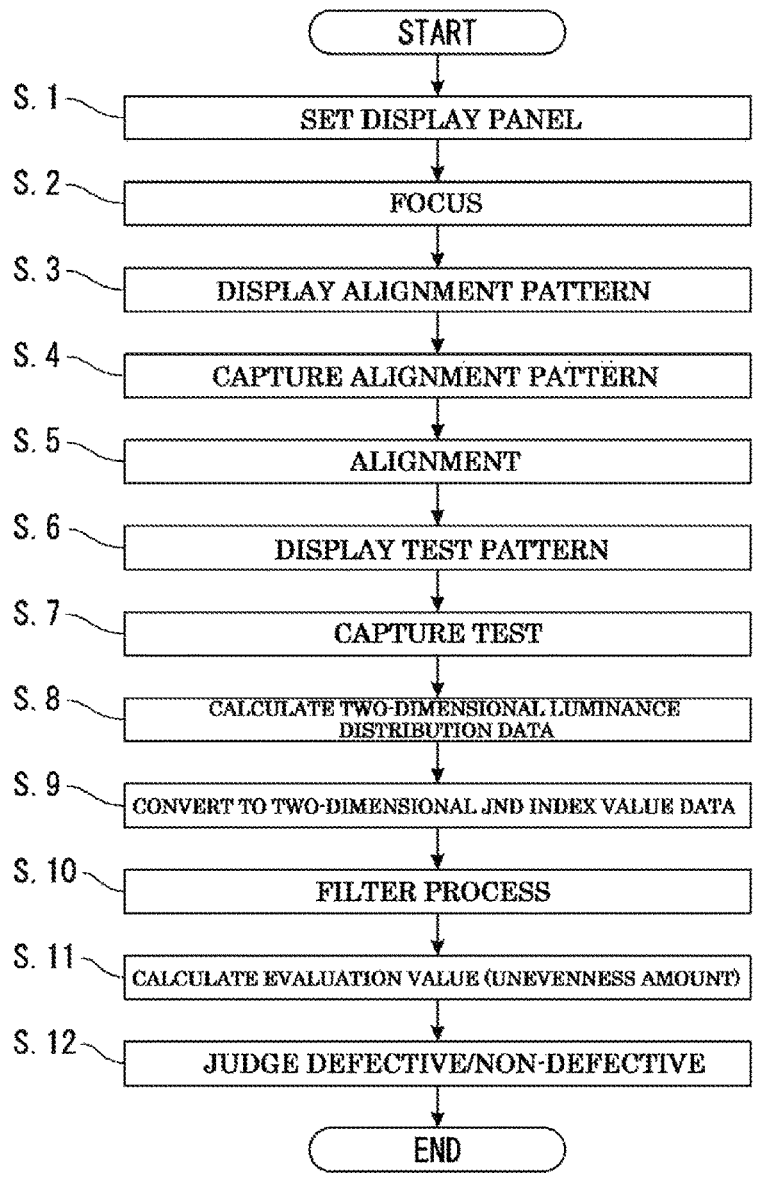
FIG. 2 is a flowchart illustrating an unevenness evaluation method carried out by the unevenness evaluation apparatus of FIG. 1.

As illustrated in FIG. 2, when the unevenness evaluation apparatus 1 evaluates unevenness in the display panel 2, first, the display panel 2 is set facing the lens 10 at a prescribed position in front of the camera 11 (step 1 (indicated by "S.1" in FIG. 2; the same applies hereinafter)), and the focus ring 9 is rotated to focus the camera 11 on the display panel 2 (step 2).

Figure 3:
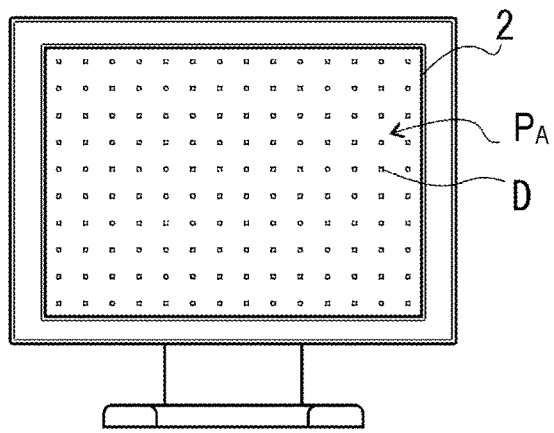
FIG. 3 is a schematic diagram illustrating an alignment pattern of the unevenness evaluation apparatus of FIG. 1.

Next, the control unit 3 causes the pattern generating device 7 to send an alignment pattern display signal (an RGB signal) to cause an alignment pattern $P_A$, illustrated in FIG. 3, to be displayed in the display panel 2 (step 3). The alignment pattern $P_A$ is a pattern of square dots D, arranged vertically and horizontally, produced by specific pixels in known locations of the display panel 2 displaying white (gray). The control unit 3 captures an image of the display panel 2 in which the alignment pattern $P_A$ is displayed using the camera 11 (step 4), detects the position of the image of the alignment pattern $P_A$ in the image capturing plane of the camera 11 (determines to which imaging elements of the camera 11 the specific pixels in the display panel 2 correspond), finds a correspondence relationship (alignment) between the pixels of the display panel 2 and the imaging elements of the camera 11 using the computation unit 4, and stores the result thereof in the storage unit 5 (step 5).

Figure 4:
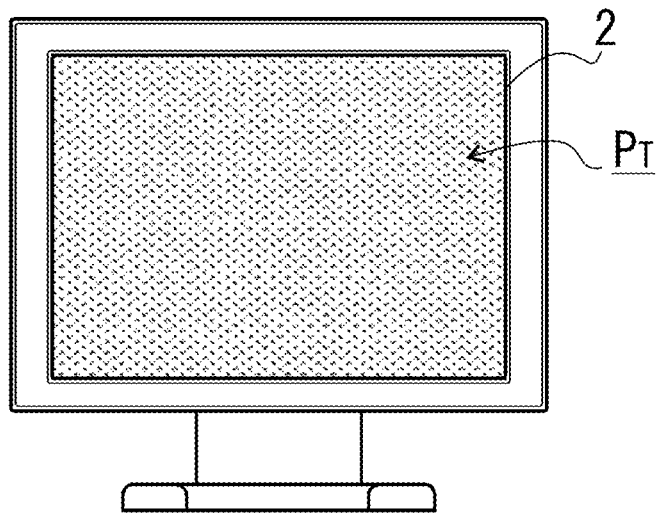
FIG. 4 is a schematic diagram illustrating a test pattern of the unevenness evaluation apparatus of FIG. 1.

Next, the control unit 3 causes the pattern generating device 7 to send a test pattern display signal (an RGB signal) to cause a test pattern $P_T$, illustrated in FIG. 4, to be displayed in the display panel 2 (step 6). The test pattern $P_T$ is a raster pattern in which all of the pixels in the display panel 2 display white (gray) at a prescribed tone. The control unit 3 captures an image of the display panel 2 in which the test pattern $P_T$ is displayed using the camera 11 (step 7), finds a luminance of each pixel in the display panel 2 through the method disclosed in JP 2016-4037A, for example, and stores two-dimensional luminance distribution data of the display panel 2 obtained as a result in the storage unit 5 (step 8).

The control unit 3 converts the two-dimensional luminance distribution data into JND index values (step 9). JND (Just-Noticeable Difference) refers to a (minimum) luminance difference of a given target that is just identifiable by a typical human observer under given observation conditions. JND index values are luminance values arranged from 1 to 1023 so that 0.05 cd/m² taken as index 1 and the luminance difference from the next index is exactly the JND.

Figure 5:
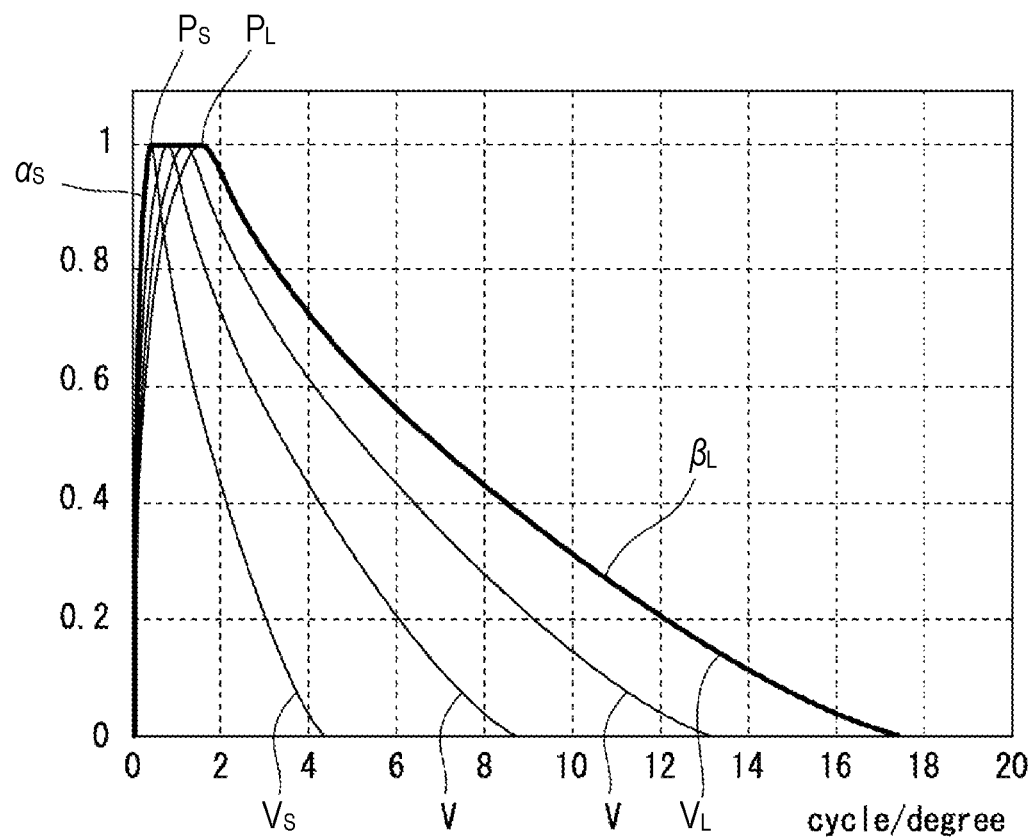
FIG. 5 is a schematic diagram illustrating filter characteristics of the unevenness evaluation apparatus of FIG. 1.

The control unit 3 then subjects the two-dimensional JND index value data to a filter process using a two-dimensional digital filter, and stores the result in the storage unit 5 (step 10). It is assumed that a plurality of visual transfer function curves for the display panel, in which as the spatial frequency increases, the recognition sensitivity increases, reaches a peak, and then decreases, are provided for each of different ranges from the display panel. In this case, as illustrated in FIG. 5, the filter used here has visual frequency characteristics (the bold line in FIG. 5) substantially passing through: a part $\alpha_S$ where the recognition sensitivity increases as the spatial frequency increases in a short-range function curve $V_S$, which among the plurality of visual transfer function curves V is the closest to the display panel; a peak part $P_S$ of the short-range function curve; a peak part $P_L$ in a long-range function curve $V_L$, which among the plurality of visual transfer function curves V is the farthest from the display panel; and a part $\beta_L$ where the recognition sensitivity decreases as the spatial frequency increases in the long-range function curve. The visual transfer function curves are expressed by the following equations.

$$V = v_1 \times (v_2 + v_3) \times 1.46032$$

$$v_1 = 1 - \exp(-f^{0.75} \times 1.333)$$

$$v_2 = \exp(-f^{1.2} \times 0.163)$$

$$v_3 = \exp\{-(f-7.59)^2 \times 0.0246\} \times 0.13$$

f: spatial frequency (cycle/degree)

Figure 6:
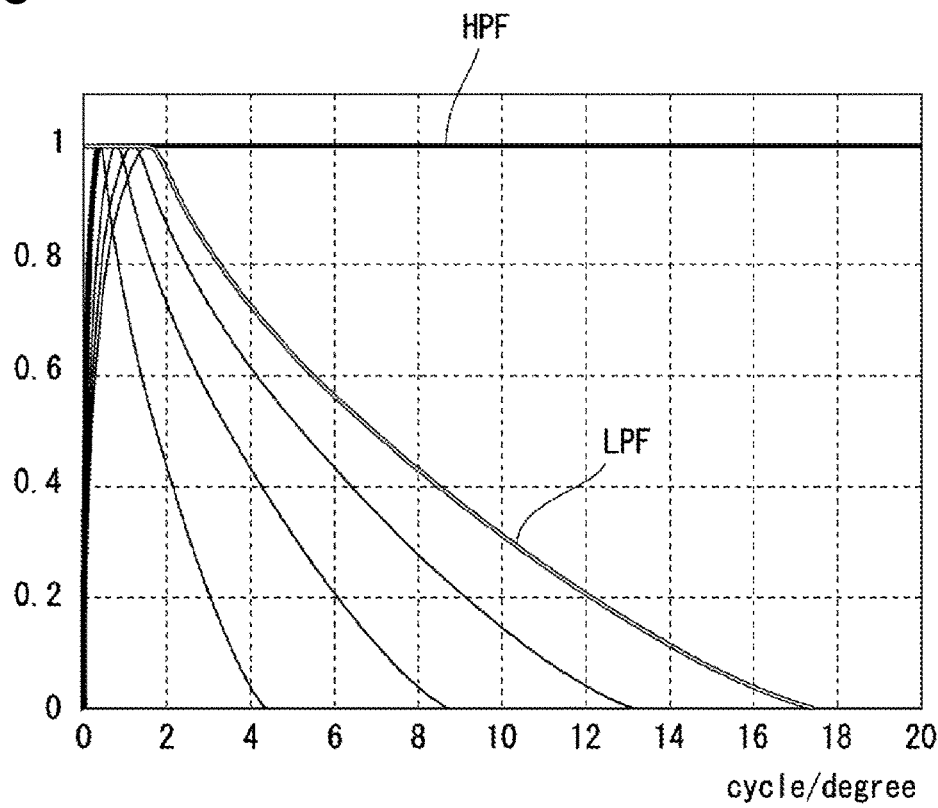
FIG. 6 is a schematic diagram illustrating low-pass filter and high-pass filter characteristics producing the filter characteristics of FIG. 5.
Figure 7:
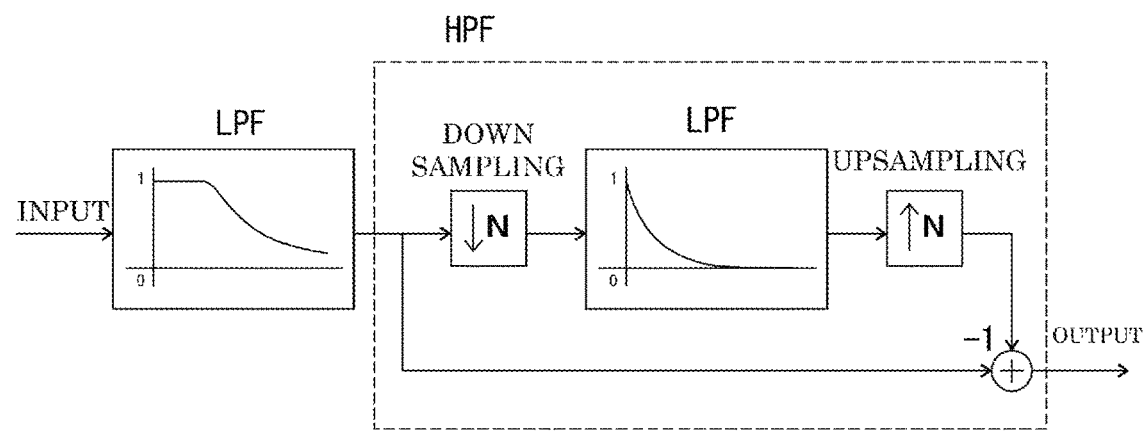
FIG. 7 is a block diagram illustrating processing of the low-pass filter and the high-pass filter producing the filter characteristics of FIG. 5.

The filter is constituted by a low-pass filter (LPF) and a high-pass filter (HPF) having the characteristics indicated in FIG. 6 being cascade-connected. As illustrated in FIG. 7, the high-pass filter is constituted by a combination of downsampling by a factor of 1/N, a low-pass filter, and upsampling by a factor of N.

Figure 8:
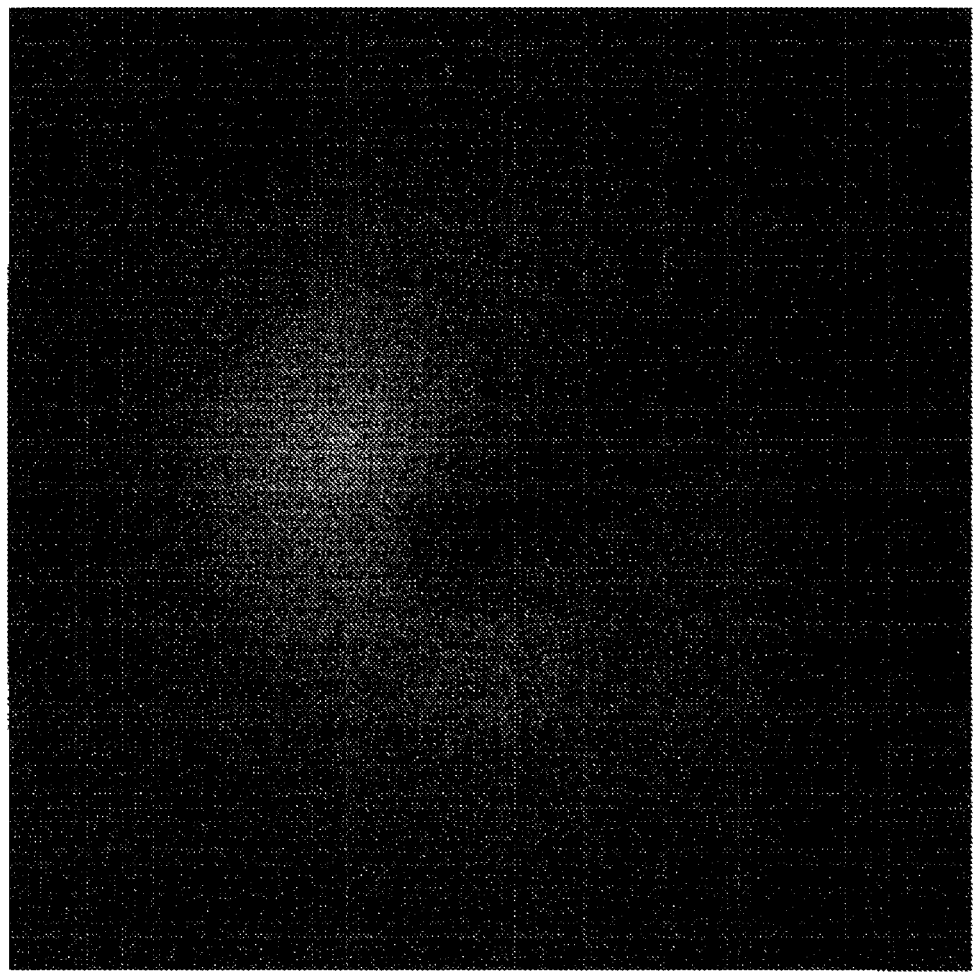
FIG. 8 is a schematic diagram illustrating an example of two-dimensional luminance distribution data of the display panel of FIG. 1.
Figure 9:
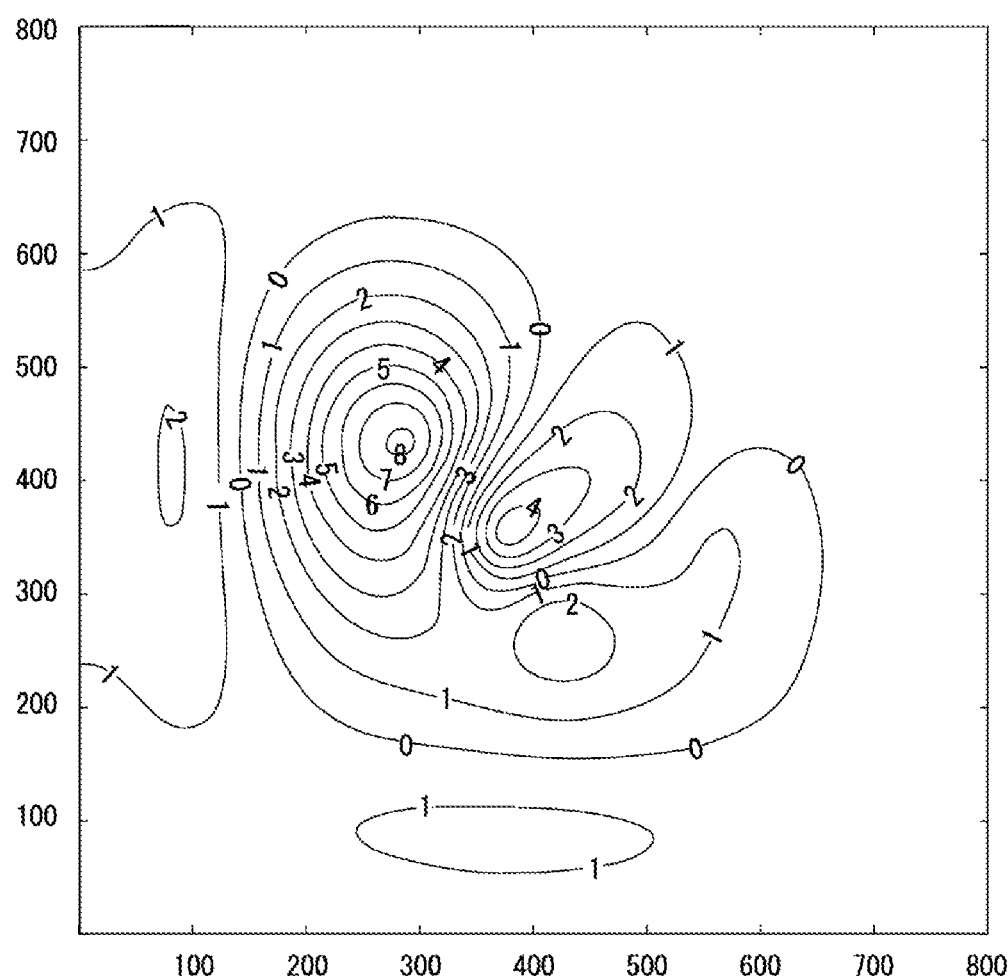
FIG. 9 is a schematic diagram illustrating an example in which the two-dimensional luminance distribution data of FIG. 8 has been converted into two-dimensional filtering data.

When the two-dimensional data of the JND index values are subjected to filtering, the filter has a DC gain of 0, and thus the output takes on values on the positive/negative sides central to 0. This output expresses the darkness of the unevenness in each part of the display panel 2. For example, if the two-dimensional luminance distribution data illustrated in FIG. 8 is converted into JND index values and filtered, the two-dimensional filtering data illustrated in FIG. 9 is obtained. The control unit 3 calculates a single evaluation value (unevenness amount) by subjecting the two-dimensional filtering data to a computation process using the computation unit 4. Here, an overall RMS value (effective value) is calculated through the following equation (step 11), and the display panel 2 is determined to be non-defective or defective by comparing the magnitude of the RMS value with a predetermined threshold (step 12).

$$\text{evaluation value (unevenness amount)} = \sqrt{\frac{1}{M} \sum_{t=1}^{M} (x_t)^2} \quad \text{[Equation 1]}$$

$x_t$: each data value
M: total number of data

In an unevenness evaluation method carried out by the unevenness evaluation apparatus 1 according to the present embodiment, it is assumed that a plurality of visual transfer function curves for the display panel, in which as the spatial frequency increases, the recognition sensitivity increases, reaches a peak, and then decreases, are provided for each of different ranges from the display panel. In this case, a filter process is carried out using a filter having visual frequency characteristics substantially passing through: a part $\alpha_S$ where the recognition sensitivity increases as the spatial frequency increases in a short-range function curve $V_S$, which among the plurality of visual transfer function curves V is the closest to the display panel; a peak part $P_S$ of the short-range function curve $V_S$; a peak part $P_L$ in a long-range function curve $V_L$, which among the plurality of visual transfer function curves V is the farthest from the display panel; and a part $\beta_L$ where the recognition sensitivity decreases as the spatial frequency increases in the long-range function curve $V_L$. Through this filter process, an unevenness evaluation value appropriate for the vision characteristics of a human when the display panel is viewed within a predetermined distance range can be calculated, making a quantitative evaluation of unevenness, suited to a variety of applications and usage methods of display panels, possible.

The visual transfer function curves are expressed as follows:

$$V = v_1 \times (v_2 + v_3) \times 1.46032$$

$$v_1 = 1 - \exp(-f^{0.75} \times 1.333)$$

$$v_2 = \exp(-f^{1.2} \times 0.163)$$

$$v_3 = \exp\{-(f-7.59)^2 \times 0.0246\} \times 0.13$$

f: spatial frequency (cycle/degree)

Accordingly, the evaluation values at low contrast, which are important in unevenness evaluations of display panels, can be made highly reliable. The filter is configured by cascade-connecting a low-pass filter and a high-pass filter, and thus the number of taps can be reduced, and the amount of calculation required by the evaluation can be reduced. Specifically, in the present embodiment, the high-pass filter is constituted by a combination of downsampling by a factor of 1/N, a low-pass filter, and upsampling by a factor of N, and thus the amount of calculation can be reduced to approximately $1/N^2$.

Although the foregoing has described an example of an embodiment for carrying out the present invention, the embodiments of the present invention are not limited to that described above, and may be changed or the like as appropriate without departing from the essential spirit of the present invention.

For example, the display panel is not limited to an organic EL panel, and may instead be a liquid crystal panel, a plasma display (PDP), a projector, or the like.

Additionally, rather than evaluating unevenness in a white (gray) raster pattern obtained by lighting all of RGB, unevenness may be evaluated for a red raster pattern obtained by lighting only R, a green raster pattern obtained by lighting only G, or a blue raster pattern obtained by lighting only B. Alternatively, unevenness may be evaluated for a display image aside from a raster pattern.

LIST OF REFERENCE CHARACTERS

1 Unevenness evaluation apparatus
2 Display panel
3 Control unit
4 Computation unit
5 Storage unit
6 Computer (luminance distribution data calculation means, filter processing means, evaluation value calculation means)
7 Pattern generating device
8 Main camera unit
9 Focus ring
10 Lens
11 Camera (image capturing means)
$P_A$ Alignment pattern
$P_T$ Test pattern
V Visual transfer function curve
$V_S$ Short-range function curve
$\alpha_S$ Part of short-range function curve where recognition sensitivity increases as spatial frequency increases
$V_L$ Long-range function curve
$\beta_L$ Part of long-range function curve where recognition sensitivity decreases as spatial frequency increases

The invention claimed is:

1. An unevenness evaluation method comprising:
an image capturing step of capturing an image of a display image in a display panel using a camera;
a luminance distribution data calculation step of calculating two-dimensional luminance distribution data of the display panel on the basis of the image of the display image captured by the camera;
a filter processing step of filtering the two-dimensional luminance distribution data using a filter, where given that a plurality of visual transfer function curves for the display panel, in which as a spatial frequency increases, a recognition sensitivity increases, reaches a peak, and then decreases, are provided for each of different ranges from the display panel, the filter has visual frequency characteristics substantially passing through a part where the recognition sensitivity increases as the spatial frequency increases in a short-range function curve which among the plurality of visual transfer function curves is the closest to the display panel, a peak part of the short-range function curve, a peak part in a long-range function curve which among the plurality of visual transfer function curves is the farthest from the display panel, and a part where the recognition sensitivity decreases as the spatial frequency increases in the long-range function curve; and
an evaluation value calculation step of calculating an evaluation value of luminance unevenness of the display panel on the basis of two-dimensional filtering data filtered by the filter.

2. The unevenness evaluation method according to claim 1, wherein the visual transfer function curves (V) are expressed as follows:

$V = v_1 \times (v_2 + v_3) \times 1.46032$ $v_1 = 1 - \exp(-f^{0.75} \times 1.333)$ $v_2 = \exp(-f^{1.2} \times 0.163)$ $v_3 = \exp\{-(f-7.59)^2 \times 0.0246\} \times 0.13$ f: spatial frequency (cycle/degree).

3. The unevenness evaluation method according to claim 2, wherein the filter is configured by cascade-connecting a low-pass filter and a high-pass filter.

4. The unevenness evaluation method according to claim 1, wherein the filter is configured by cascade-connecting a low-pass filter and a high-pass filter.

5. An unevenness evaluation apparatus comprising:
a camera for capturing a display image in a display panel; and
a computer configured to:
calculate two-dimensional luminance distribution data of the display panel on the basis of the image of the display image captured by the camera;
filter the two-dimensional luminance distribution data using a filter, where given that a plurality of visual transfer function curves for the display panel, in which as a spatial frequency increases, a recognition sensitivity increases, reaches a peak, and then decreases, are provided for each of different ranges from the display panel, the filter has visual frequency characteristics substantially passing through a part where the recognition sensitivity increases as the spatial frequency increases in a short-range function curve which among the plurality of visual transfer function curves is the closest to the display panel, a peak part of the short-range function curve, a peak part in a long-range function curve which among the plurality of visual transfer function curves is the farthest from the display panel, and a part where the recognition sensitivity decreases as the spatial frequency increases in the long-range function curve; and
calculate an evaluation value of luminance unevenness of the display panel on the basis of two-dimensional filtering data filtered by the filter.

6. The unevenness evaluation apparatus according to claim 5, wherein the visual transfer function curves (V) are expressed as follows:

$V = v_1 \times (v_2 + v_3) \times 1.46032$ $v_1 = 1 - \exp(-f^{0.75} \times 1.333)$ $v_2 = \exp(-f^{1.2} \times 0.163)$ $v_3 = \exp\{-(f-7.59)^2 \times 0.0246\} \times 0.13$ f: spatial frequency (cycle/degree).

7. The unevenness evaluation apparatus according to claim 6, wherein the filter is configured by cascade-connecting a low-pass filter and a high-pass filter.

8. The unevenness evaluation apparatus according to claim 5, wherein the filter is configured by cascade-connecting a low-pass filter and a high-pass filter.

* * * * *